Feb. 4, 1936.  A. E. PETERSEN ET AL  2,029,831
PROCESS FOR CONCENTRATING RUBBER LATICES
Filed May 6, 1932  2 Sheets—Sheet 1
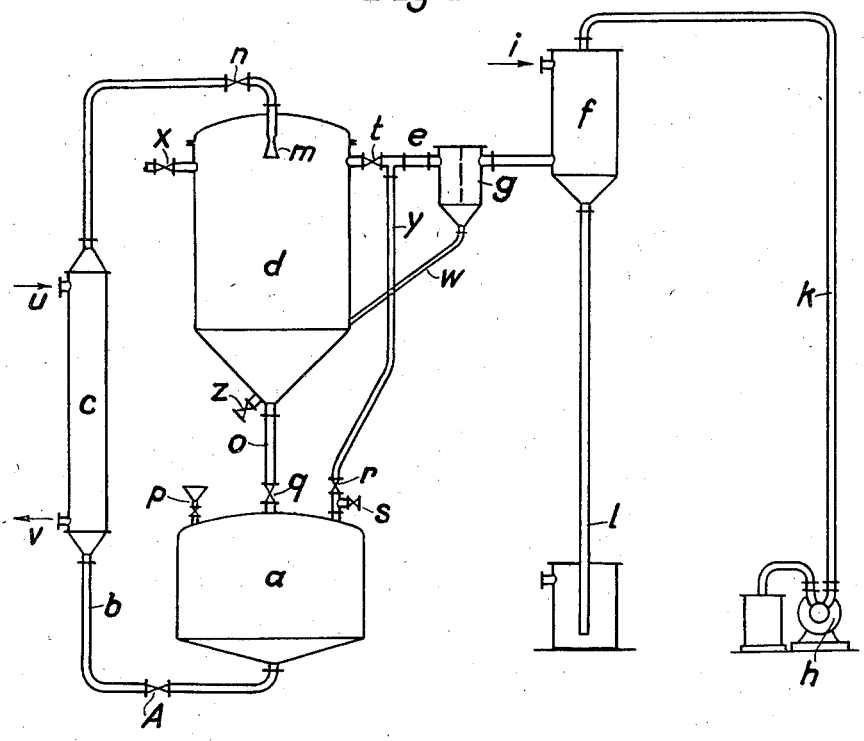
Inventors,
Alfred Eduard Petersen
Wilhelm Gensecke
by Roberts, Cushman + Woodbury
Attys.

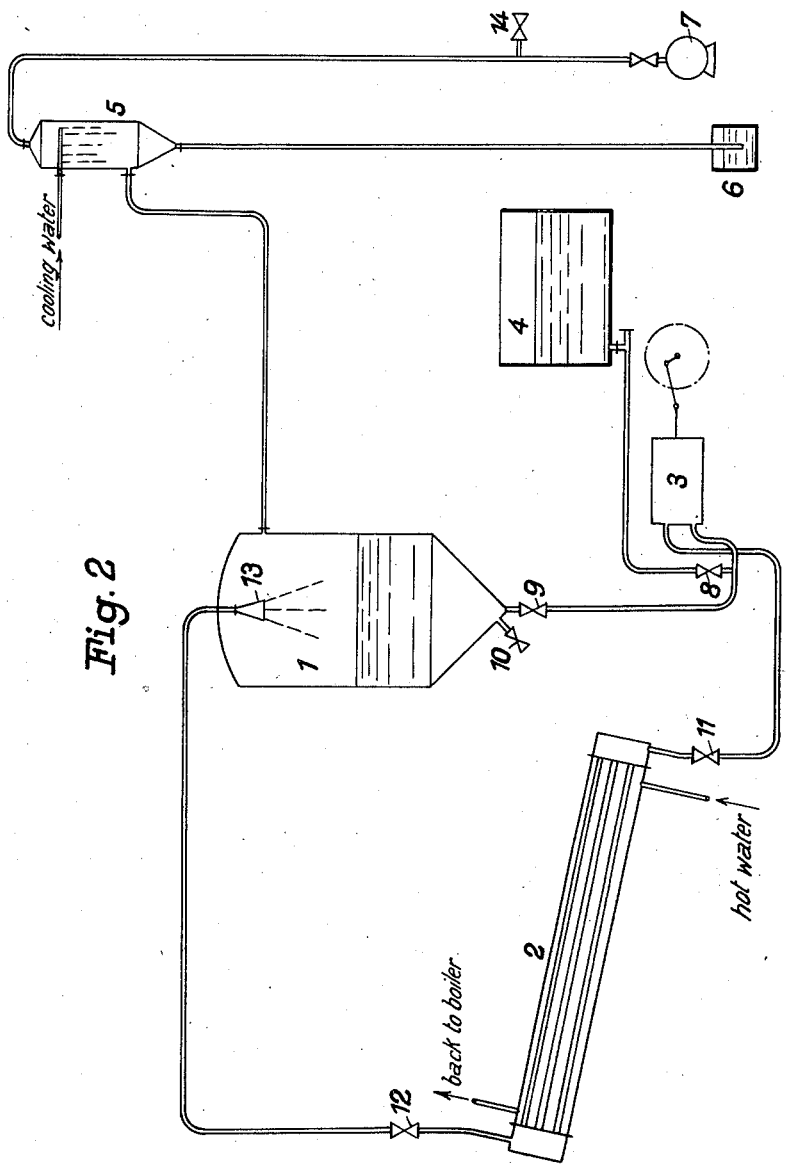

Patented Feb. 4, 1936

2,029,831

UNITED STATES PATENT OFFICE 2,029,831

PROCESS FOR CONCENTRATING RUBBER LATICES

Alfred Eduard Petersen, Frankfort-on-the-Main, and Wilhelm Gensecke, Gonzenheim, near Frankfort-on-the-Main, Germany, assignors to Metallgesellschaft Aktiengesellschaft, Frankfort-on-the-Main, Germany, a corporation of Germany Application May 6, 1932, Serial No. 609,660
In Germany May 9, 1931

10 Claims. (Cl. 18—50)

This invention relates to a process for inspissating or concentrating rubber latex.

In consequence of the progressively increasing direct employment of rubber latex in the rubber industry, the problem of concentrating the latex has also grown in importance and there has, therefore, been no lack of attempts to elaborate practicable methods of concentration, although hitherto without any completely satisfactory results.

Four fundamentally different methods have been pursued in order to effect the concentration of the latex, namely by centrifuging, creaming, filtration and evaporation, at higher or lower temperature, of the water contained in the latex. In the concentrates obtained by the first three methods, the serum constituents are removed to a great, or nearly complete, extent, whereas the products obtained with the lastnamed process, i. e., by inspissation, contain all the constituents of the latex, with the exception of a larger or smaller proportion of its water. Consequently, the products of the latter process are the only ones which can be transformed, by simple dilution with water, into rubber dispersions which are practically equivalent, in properties and composition, to the original latex. On this account, inspissation is to be preferred, in principle, to the other processes for the concentration of rubber latex.

Owing to the unique combination of certain properties, namely a high tendency to powerful foaming, extroardinary stickiness and the readiness with which it coagulates, rubber latex is attended with quite unusual and unique difficulties in all inspissation processes. For this reason, only very few of the numerous methods proposed for inspissating rubber latex have proved practically useful, and many processes and apparatus, which were satisfactory for concentrating other liquids, have failed completely when applied to latex.

It was first endeavoured, with but little success, to inspissate latex by stirring it in open pans. Subsequently, closed vacuum vessels were tried, and latex was also passed through heated vacuum tubes. Attempts were made to inspissate latex in very shallow pans, a current of warm gas being passed over the surface of the latex, which was kept stirred the while. Concentration was also attempted by passing fine bubbles of warm gas through the latex, gas being blown on to the surface of the latex, with the object of counteracting the powerful foaming set up by the gas treatment. In another concentration process, thick streams of the latex were passed repeatedly vertically downwards through a heating chamber. Still another attempt to concentrate latex consisted in spraying it into a warm air space or current of air, if desired after pre-concentration, in admixture with protective colloids, in a centrifuge. It has also been proposed to concentrate latex by the so-called Kestner pump process. Other proposals were based on the idea of spreading out and warming a portion of the latex in thin layers, so as to expel some of its water in the form of steam, the resulting concentrate being then united with the bulk of the latex, and the operations repeated until the latex attained the desired degree of concentration. For this purpose, use was made of drums, adapted to rotate about their longitudinal axis, only the lower part of the drum being charged with the latex, which was heated, a current of air being blown axially through the drum and over the surface of the latex. In this manner the water was chiefly expelled from the portions of latex that adhered to the walls of the drum until it finally dipped again into the bulk of the charge. The same fundamental idea was also applied by means of a great variety of other types of apparatus.

As already mentioned, most of the very numerous and divergent processes and apparatus proposed for concentrating latex failed to attain any practical success. All the boiling processes in particular, have failed, partly through inability to reduce the powerful foaming of the latex to harmless dimensions, and partly on account of coagulation, to which the latex films forming the foam bubbles are particularly liable when water is extracted from them by evaporation. The only hitherto practicable processes have been evaporative processes in which the inspissation proceeds in presence of air or other gases which absorb in the form of vapour, the water that is to be expelled from the latex. Even these processes however, do not operate satisfactorily unless care be taken to keep the superficial layer of the latex continuously mingled with the deeper layers, the expulsion of the water proceeding at a relatively slow rate. Unless fresh particles of latex were continuously brought to the evaporative surface, skinning and coagulation quickly ensued.

Apart from a large consumption of heat, all these evaporative processes have the further great disadvantage that considerable quantities of air are stirred into the concentrate and are likely to injure the latex subsequently either through oxidation or by favouring the development of microorganisms.

Fundamentally the invention comprises conducting the rubber latex—which is warmed under conditions precluding the formation of steam and is preferably treated with the usual anticoagulants, such as alkali, protective colloids and the like—in a form presenting a large surface, into an unheated vacuum vessel which is under a pressure—which is also maintained during the admission of the latex—that is lower than the vapour pressure of the latex at the temperature at which the latter is admitted into the evaporator. The latex is admitted into the evaporator through one or more narrow openings, preferably through one or more nozzles in the upper part of the evaporator.

The feed member is preferably disposed centrally in the top of the evaporator, but may also, for example, be disposed laterally, for example tangentially. Since, under the specified conditions of temperature and pressure, the liquid enters the evaporator at a temperature exceeding its boiling point under the pressure obtaining in the evaporator, it begins to boil immediately on entering and, in so doing, gives off steam until—owing to the consumption of heat by the evaporation process—the temperature of the latex has fallen to substantially its boiling point at the pressure obtaining in the evaporator.

The amount of water liberated, by expansion in the evaporator depends therefore on the difference between the admission temperature of the latex and the temperature at which the latter boils under the pressure in the evaporator. The greater the said difference, the larger the amount of water vaporized during the expansion, and it is therefore advantageous to keep the pressure in the evaporator as low as possible. This is also advisable for the further reason that the evaporation proceeds the more violently and explosively, the greater the difference between the temperature of the liquid entering the evaporator and the temperature of equilibrium corresponding to the pressure in the evaporator, the said latter temperature being the lower in proportion as said pressure is also lower. Violent ebullition is a desirable aim, because it most effectively reduces the liquid to a state of fine division, the ebullition consequently leading to the almost instantaneous establishment of the state of equilibrium. As a general rule, it is advisable that the pressure in the evaporator should be maintained at least at 300 mm. mercury gauge below that obtaining in the heating apparatus, and that the operation should be conducted under a high vacuum in the evaporator for example a pressure not exceeding 70 mm. and preferably not exceeding 50 mm. mercury gauge for example a pressure of 40 mm. mercury gauge.

For the successful performance of the hereindescribed process, it is important that the evaporation of such water as is evaporable from the entering latex, under the conditions specified, should be completed before said latex reaches that which is already collected in the bottom of the evaporator, or the latter will begin to boil and troubles through foaming will arise in consequence. By maintaining the specified working conditions a concentrate, wholly or almost free from foam is obtained at the bottom of the evaporator, since—strangely enough—as the result of the violent evaporation of the finely atomized latex, no foam is usually formed, and any small amount that may occasionally appear, rapidly disperses under the influence of the vacuum.

Moreover, the evaporation in the chamber proceeds without any skin formation or coagulation, so that the hereindescribed process furnishes concentration products of hitherto unattained quality. It is also possible to concentrate the inspissated liquid, without damage, to a substantially higher degree than heretofore.

Frequently a single expansion does not suffice to effect the desired concentration. The treatment must therefore be repeated several times, the latex being led in a cycle from the evaporator back to the heating system and from thence to the evaporator or to a plurality of evaporators in series. If the evaporating chamber is arranged at a higher level than the heating system, the concentrated rubber latex can be led by its hydrostatic pressure from the evaporator into the heating system and can be aspirated from the heating system into the evaporator by using the vacuum prevailing in the latter. In this method of operation no pump is required for circulating the liquid.

In carrying out the hereindescribed process, the liquid is warmed up in a heating apparatus, being subjected to a pressure equal or superior to the vapour pressure of water at the temperature at which the liquid is intended to be heated. It is not until the liquid enters the evaporation chamber that a sudden release of pressure, to the level of that obtaining in the evaporator, occurs. Should the pressure in the heating apparatus be insufficient to prevent the formation of steam completely, this is not necessarily injurious, since the resulting bubbles of foam will burst directly they enter the evaporator. Nevertheless, it is advisable to prevent the formation of steam in the heating apparatus, because there is always the risk of rubber, coagulated by the heat, depositing on the walls of the heating apparatus.

The process is carried out, for example, in the following manner: The rubber latex, heated to 90° C. for example, in a known heating apparatus, by means, for example, of steam or hot water, is introduced through a suitably designed nozzle into an evaporation chamber in which a vacuum of (for example) 90% is established, corresponding to a boiling point, for water, of about 46° C. At the moment of entering the evaporator, a rapid fall in temperature of 44° C. occurs, in consequence of the evaporation of water from the latex, the water content of which is lowered by about 7%. If, for example, it is desired to concentrate a rubber latex containing 35% of dry matter to a dry content of 75%, it will be necessary, in operating within the specified range of temperature, to repeate the operations of heating, and cooling in vacuo, about eleven times. The wider the range of temperature adopted, the smaller the number of repetitions needed to obtain a predetermined concentration.

It has been ascertained that a suitable design of nozzle for admitting the liquid into the evaporator is one similar to the Laval nozzle, consisting of a convergent and a divergent portion, the narrowest aperture being so devised as to throttle the flow of liquid to such a degree that no evaporation commences on the near side of the nozzle. The flared portion of the nozzle is designed so as to obtain a trouble-free transformation of energy—so far as is possible—and a steady diminution of pressure during the entry of the liquid into the evaporator. If desired, a plurality of nozzles may also be employed.

The invention will hereinafter be more fully described with reference to the accompanying drawings, which illustrate diagrammatically and by way of example, two embodiments of apparatus suitable for carrying the invention into practical effect and in which:—

Fig. 1 shows one embodiment; and
Fig. 2 a second embodiment.

In the embodiment shown in Fig. 1, $a$ is a vessel containing the rubber latex to be inspissated. The latex passes through a pipe $b$ and a heating apparatus $c$ into the evaporator $d$, which communicates with the water-cooled condenser $f$ by way of the pipe $e$. The condenser is of the injection type, into which the water is admitted through $i$, whilst the effluent water is carried away through a barometric down pipe $l$. $k$ is the pipe connecting the condenser with the air-pump $h$, which generates and maintains the vacuum. $g$ is a trap for separating any particles of the liquid that may be carried over into the pipe $e$, these being returned to the evaporator through the pipe fitted with the cut-off $w$. The heating apparatus $c$ may be heated by steam, which is admitted through $u$ and condensed on the heating surfaces, the condensate being run off through $v$. More advantageously however it can be heated by means of hot water. $n$ is a control valve and $p$ a device for charging the vessel $a$ with the latex.

During the aspiration and evaporation of the latex in the evaporator $d$, the pipe $o$ connecting $d$ and $a$ is closed by the valve $q$ and the pipe between $a$ and the vacuum pipe $e$ is closed by the valve $r$. The valves $s$ and A are opened. Since, in the meantime, the vessel $a$ is under atmospheric pressure, for example, whilst a negative pressure prevails in the evaporator $d$, no special pump is needed for aspirating the charge and the liquid flows from $a$ through the heater $c$ to the nozzle $m$, by means of which it is atomized into the evaporator. The liquid is heated in the heater, and is cooled and concentrated, by the evaporation process, in the evaporator. It collects in the bottom of the evaporator $d$, in which, when operated under the conditions prescribed in accordance with the invention, the concentration is effected without any foaming or coagulation.

As soon as the contents of the vessel $a$ have passed over into the evaporator $d$, the evaporation process is suspended, for which purpose the valves $n$, $s$ and A are closed and the valves $r$ and $q$ opened. Since the same negative pressure now exists in the vessel $a$ as in the evaporator $d$, the contents of $d$ flow back, by gravity, into $a$. In order to accelerate this operation, the vacuum pipe may be provided with valves $t$ and $w$, and the evaporator $d$ with a valve $x$ which establishes communication between $d$ and the atmosphere.

If the valves $t$ and $w$ be closed, and the valve $x$ opened, atmospheric pressure is established in the evaporator $d$ and there will now be a difference of pressure, between $a$ and $d$, which may be up to about 1 atmosphere and correspondingly increase the flow of the liquid from $d$ to $a$.

The pipe containing the valve $x$ may also be connected to a source of compressed air or gas, thereby enabling the pressure difference between $d$ and $a$ to be increased at convenience, and correspondingly reduce the time required for emptying the contents of $d$ into $a$. When $d$ has been emptied, the inspissation process can be repeated, by suitably manipulating the valves, as often as is needed to attain the final degree of concentration. The finished concentrate can be drawn off through the outlet branch $z$.

The heating apparatus $c$ is preferably kept full of latex all the time. In such event there is no need to interrupt the heating during the short period in which the circulation of liquid through $c$ is suspended for the purpose of drawing off the concentrate from the evaporator. Of course, however, the admission of the heating medium— which may consist of steam, hot water, &c.— to the heater may be shut off at any time if there is any risk of the liquid that is to be inspissated becoming overheated, or if the heating apparatus is to be completely or partially emptied during the evaporation.

The method of operation described with reference to Fig. 1 in which the circulation of the liquid is effected in the hereindescribed manner, solely by the differences in hydrostatic and gas pressures, has the advantage of dispensing with any circulation pump for the latex. On the other hand, however, it is attended with certain drawbacks. Thus, the vacuum must be interrupted after each circulation of the liquid, and it is also necessary to manipulate a plurality of valves during each circulation. Moreover, owing to the increasing viscosity, the amount of latex supplied to the feed device of the apparatus per unit of time diminishes continually during the operation. These difficulties can be overcome by circulating the liquid with the aid of a pump.

A suitable apparatus of this kind is represented, diagrammatically, in Fig. 2.

The main members of this apparatus are: a vacuum evaporator 1, which is adapted to be evacuated by an air-pump 7, a preheater 2 (preferably of the hot water type), a circulation pump 3, a latex stock tank 4 and a condenser 5.

The apparatus may be operated for example, in the following manner:—

After the evaporator 1 has been evacuated by the air-pump 7 whilst the valves 8, 9, and 10 remain closed, a charge of latex from the stock tank, is allowed to enter into the evaporator 1, whilst the pump 3 continues in operation, and after opening valve 8, through the valve 8, pump 3, valve 11, heater 2, suitably adjusted regulating slide 12 and the nozzle 13, and is sprayed thereinto. As soon as the amount of latex corresponding to a charge has been introduced into the apparatus, the valve 8 is closed and the valve 9 opened. The charge in the apparatus is then maintained in continuous circulation, being conveyed from the bottom of the evaporator 1 to the preheater 2 where it is warmed up and is then passed to the nozzle 13 by way of the regulating slide 12.

The latex sprayed into the evaporator through the nozzle and instantly attaining a state of ebullition, parts (as already described) in a practically instantaneous manner, with that proportion of its contained water that is vaporizable, by internal evaporation, under the specified conditions of temperature and pressure. The steam liberated is drawn, by the airpump, into the condenser and condensed therein. Owing to the consumption of heat in the evaporation, the temperature of the injected liquid sinks practically to the boiling point corresponding to the pressure in the evaporator.

The latex concentrated and cooled by the evaporation process collects in the bottom of the evaporator 1 and is returned into circulation by the pump 3. Inasmuch as the viscosity of the charge and therefore the resistance to propulsion of the liquid, increase as concentration progresses, the control valve 12 is opened further in proportion with the increasing concentration, and, in this manner, the load on the circulation pump is reduced in the later stages of the concentration process. The liquid is kept circulating until the desired degree of concentration of the latex has been attained. After opening the valve 14, which establishes communication with the outside air, the finished concentrate can be drawn off through the outlet 10.

In this manner, a charge of latex can be brought to the desired concentration in a continuous operation.

In view of the considerable increase in viscosity during very wide ranges of concentration, such as from 35% to 75% of dry matter, the inspissation may be carried on, with advantage, in two or even more stages. In such event, operating for example in two stages, the concentration of the latex may be raised, for example from 35% to 65% in the first stage and then from 65% to 75% in a second apparatus with a wider nozzle aperture and wider pipes. Owing to the decrease in volume, it is preferable to perform the first stage (or stages) in several apparatus simultaneously and, in the second stage, to continue the further concentration of the united semi-concentrates from the first stage sets of apparatus, in a single apparatus.

*Example*

An apparatus of the kind illustrated in Fig. 2 was employed, comprising an evaporator with a cubic capacity of 8 cu. m. and a feed nozzle having an aperture 3 cm. in diameter at the narrowest point. The preheater was operated with water at 85–90° C., thereby warming the material to be concentrated, to about 60° C. The pressure in the evaporator was maintained at about 17 mm. mercury gauge. During the expansion the temperature of the latex receded from 60° to 30° C. Under these conditions, the concentration of 1900 kgs. of 33% latex to 75% strength took 8 hours.

The range of temperature within which the apparatus can be operated is extremely wide, the temperature conditions being selected according to the special requirements in each case. Where rapid concentration is desired, the temperature differences selected should be as large as possible, that is, the heating-up temperature should be high, in fact, it may, without objection, be as high as the boiling point of water, or sometimes even higher. All that is needed is to provide in the preheater, a pressure that is high enough to prevent the formation of steam. In general, however, it is inadvisable to allow the temperature to exceed the boiling point of water, because, with such high temperatures, the risk is already incurred of the walls of the heater becoming coated with a deposit of coagulated rubber. The lower the heating temperature, the lower the risk of such troubles arising. Low preheating temperatures of the latex are particularly advisable when importance is attached to obtaining the latex in a chemically unaltered condition. In such case, the increased protection of the latex must be purchased by an increased number of circulations.

The hereindescribed process affords great advantages. In the existing evaporative processes of concentration, the material under treatment must be kept stirred continuously throughout. Since, on a certain concentration being reached, the viscosity increased considerably, the air bubbles, incorporated by the stirring, were stubbornly retained by the highly viscous masses. Consequently, it has never been found possible, so far, to obtain, by evaporative means, latex concentrates with a content of 60% and over of dry matter—that is, concentrates containing all the constituents of native latex—without very considerable inclusions of air. The present process is the first to enable an evaporated concentrate, with the specified content of dry matter, completely free from air inclusions. This air-free condition is important in several respects.

For instance, the specific gravity of the air-free concentrate is not inconsiderably higher than that of those previously obtained. It has been found, for example, that a concentrate with 73.5% of dry matter, prepared in accordance with the invention, had the sp. gr. 0.97, whereas one prepared in a rotary-drum evaporator, acording to the known process, had a sp. gr. of only 0.92. The higher density enables the transport receptacles to be utilized to substantially greater advantage. Moreover, the freedom from air is valuable insofar that the development of bacteria in the concentrate is greatly restricted, a point of high importance to the keeping properties of the product. Damage due to oxidation is also prevented. Stability during transport is also favourably affected by the freedom from air, inasmuch as air imprisoned in the concentrate gradually escapes in many instances from the mass and collects above the surface of the latter, thereby leading to the formation, above the concentrate in the receptacles, of a gas space which—for example, through the movements of the ship during transport—enables the concentrate to shake about and may thereby cause it to coagulate.

The treatment of the latex during the concentration exposes the latex much less to detrimental influences than under the conditions of the existing method of inspissation by evaporation, since the latex has merely to be raised just to the point of injection temperature, and is then cooled down again at once, so that, in the process according to the invention, the latex remains at higher temperatures for nearly a substantially shorter time. Moreover, the process can be so arranged that considerably lower temperatures are sufficient, with the result that the heat-sensitive constituents, and therefore also the natural protective substances of the latex—together with any heat-sensitive protective substances that may have been added—do not suffer damage, and consequently concentrates are obtained of substantially higher stability than by existing processes.

The process also enables stable, reversible concentrates to be produced in a more highly concentrated form than with the existing processes. It enables skinning during concentration to be avoided, and, in addition, is more economical than the older processes, less attention being also required.

In addition to rubber latex, the latices of balata and gutta-percha are also to be regarded as latices that can be concentrated in accordance with the invention. The latices can be employed in a natural or conserved condition, and provided with the usual additions, such as ageing media, plasticizers, stabilizers, fillers, colouring matters and vulcanizing agents, and also in the vulcanized state. In order to obtain high concentrations, they must be provided with anticoagulant media.

We claim:—

1. A process for concentrating latices by evaporation, which comprises heating the latex to be concentrated whilst avoiding the formation of steam and introducing said latex in a state presenting a large surface, into a vacuum evaporator at a temperature which is higher than the boiling temperature of the latex under the pressure prevailing in the evaporator.

2. A process for concentrating latices by evaporation, which comprises adding protective anticoagulant substances to the latex to be concentrated, heating said latex whilst avoiding the formation of steam and introducing same in a state presenting a large surface, into a vacuum evaporator at a temperature which is higher than the boiling temperature of the latex under the pressure prevailing in the evaporator.

3. A process for concentrating latices by evaporation, which comprises heating the latex to be concentrated whilst avoiding the formation of steam, introducing said latex in a state presenting a large surface into a vacuum evaporator at a temperature which is higher than the boiling temperature of the latex under the pressure prevailing in the evaporator, and repeating said process until the desired concentration has been attained.

4. A process for concentrating latices by evaporation, which comprises adding protective anticoagulant substances to the latex to be concentrated, heating said latex whilst avoiding the formation of steam, introducing same in a state presenting a large surface into a vacuum evaporator at a temperature which is higher than the boiling temperature of the latex under the pressure prevailing in the evaporator, and repeating said process until the desired concentration has been attained.

5. A process for concentrating latices by evaporation, which comprises heating the latex to be concentrated whilst avoiding the formation of steam and introducing said latex through a nozzle into a vacuum evaporator at a temperature which is higher than the boiling temperature of the latex under the pressure prevailing in the evaporator.

6. A process for concentrating latices by evaporation, which comprises heating the latex to be concentrated whilst avoiding the formation of steam and introducing said latex through a nozzle of such a form that the nozzle cross-section increases from its narrowest point towards the outlet, into a vacuum evaporator at a temperature which is higher than the boiling temperature of the latex under the pressure prevailing in the evaporator.

7. A process for concentrating latices by evaporation, which comprises heating the latex to be concentrated, whilst avoiding the formation of steam and introducing same in a state presenting a large surface, into a vacuum evaporator at a temperature which is higher than the boiling temperature of the latex under the pressure prevailing in the evaporator, which is maintained below 70 mm. mercury gauge.

8. A process for concentrating latices by evaporation, which comprises heating the latex to be concentrated, whilst avoiding the formation of steam and introducing same in a state presenting a large surface, into a vacuum evaporator at a temperature which is higher than the boiling temperature of the latex under the pressure prevailing in the evaporator, which is maintained below 50 mm. mercury gauge.

9. A process for concentrating latices by evaporation, which comprises heating the latex to be concentrated whilst avoiding the formation of steam and introducing said latex in a state presenting a large surface, into a vacuum evaporator at a temperature which is higher than the boiling temperature of the latex under the pressure prevailing in the evaporator, which is maintained upwards of 300 mm. mercury gauge below the pressure prevailing in the heating system.

10. A process for concentrating latices by evaporation, which comprises repeatedly heating the latex to be concentrated whilst avoiding the formation of steam, introducing said latex in a state presenting a large surface into a vacuum evaporator at a temperature which is higher than the boiling temperature of the latex under the pressure prevailing in the evaporator and effecting the circulation of the latex through the apparatus with the aid of a pump.

ALFRED EDUARD PETERSEN.
WILHELM GENSECKE.